United States Patent
Sarwer et al.

(10) Patent No.: US 10,666,986 B1
(45) Date of Patent: May 26, 2020

(54) SUB-BLOCK BASED ENTROPY CODING FOR EMBEDDED IMAGE CODEC

(71) Applicant: SONY CORPORATION, Tokyo (JP)

(72) Inventors: Mohammed Golam Sarwer, Sunnyvale, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/297,515

(22) Filed: Mar. 8, 2019

(51) Int. Cl.
*G06K 9/36* (2006.01)
*H04N 7/12* (2006.01)
*H04N 19/91* (2014.01)
*H04N 19/176* (2014.01)

(52) U.S. Cl.
CPC ........... *H04N 19/91* (2014.11); *H04N 19/176* (2014.11)

(58) Field of Classification Search
CPC ...................................................... H04N 19/91
USPC .................................................... 375/240.23
See application file for complete search history.

(56) References Cited

U.S. PATENT DOCUMENTS

| | | | | |
|---|---|---|---|---|
| 5,227,878 A | * | 7/1993 | Puri | H04N 19/105 348/699 |
| 5,986,711 A | * | 11/1999 | Pau | H04N 19/61 375/240.18 |
| 8,483,282 B2 | | 7/2013 | Karczewicz et al. | |
| 9,456,216 B2 | | 9/2016 | Holcomb et al. | |
| 2002/0181795 A1 | * | 12/2002 | Chen | G06T 9/007 382/251 |

FOREIGN PATENT DOCUMENTS

CA     2934930 C     10/2011

OTHER PUBLICATIONS

Maxim P. Sharabayko et al., " Fast Rate Estimation for RDO Mode Decision in HEVC", www.mdpi.com/journal/entropy, ISSN 1099-4300 , Entropy 2014, 16,6667-6685; doi 10.3390/e16126667.

* cited by examiner

*Primary Examiner* — Hee-Yong Kim
(74) *Attorney, Agent, or Firm* — Haverstock & Owens LLP

(57) ABSTRACT

Sub-block based entropy coding more efficiently encodes and decodes content by selecting the best coding scheme for sub-blocks of content. By comparing coding schemes for each sub-block of content and selecting the coding scheme which utilizes the fewest bits, the content is more efficiently encoded.

18 Claims, 8 Drawing Sheets

SUB-BLOCK BASED ENTROPY CODING FOR EMBEDDED IMAGE CODEC

FIELD OF THE INVENTION

The present invention relates to video coding. More specifically, the present invention relates to entropy coding using sub-blocks.

BACKGROUND OF THE INVENTION

Video coding includes quantization, Differential Pulse-Code Modulation (DPCM), entropy coding and refinement. Entropy coding is a lossless data compression scheme which compresses data by replacing each fixed-length input symbol with the corresponding variable-length output codeword.

SUMMARY OF THE INVENTION

Sub-block based entropy coding more efficiently encodes and decodes content by selecting the best coding scheme for sub-blocks of content. By comparing coding schemes for each sub-block of content and selecting the coding scheme which utilizes the fewest bits, the content is more efficiently encoded.

In one aspect, a method programmed in a non-transitory memory of a device comprises partitioning a content block into a plurality of sub-blocks, encoding at least one sub-block of the plurality of sub-blocks using a plurality of variable length coding tables to generate a plurality of encoded sub-blocks and selecting an encoded sub-block of the plurality of encoded sub-blocks based on which encoded sub-block of the plurality of encoded sub-blocks includes a fewest amount of bits. The plurality of sub-blocks include luma sub-blocks, wherein a first row of a luma sub-block is encoded using a first coding table, and a second row of the luma sub-block includes two sub-blocks which are each encoded using the first coding table, a second coding table or a third coding table, further wherein the two sub-blocks are encoded using a same coding table or a different coding table. Encoding the at least one sub-block of the plurality of sub-blocks includes a bit to signal whether luma sub-block encoding is on or off, and a bit to signal a luma sub-block type which specifies a coding table used for encoding a luma sub-block. The plurality of sub-blocks include chroma sub-blocks, wherein when the chroma sub-blocks are partitioned by a horizontal partition, a U block includes two sub-blocks, and a V block includes two sub-blocks, wherein a first sub-block of the two sub-blocks of the U block is encoded using a first coding table or a second coding table, and the second sub-block of the two sub-blocks of the U block is encoded using all zeroes as coefficients, the first coding table or the second coding table, and wherein a first sub-block of the two sub-blocks of the V block is encoded using the first coding table or the second coding table, and the second sub-block of the two sub-blocks of the V block is encoded using all zeroes as coefficients, the first coding table or the second coding table. The plurality of sub-blocks include chroma sub-blocks, wherein when the chroma sub-blocks are partitioned by a vertical partition, a U block includes two sub-blocks, and a V block includes two sub-blocks, wherein a first sub-block of the two sub-blocks of the U block is encoded using all zeroes as coefficients, a first coding table or a second coding table, and the second sub-block of the two sub-blocks of the U block is encoded using all zeroes as coefficients, the first coding table or the second coding table, and wherein a first sub-block of the two sub-blocks of the V block is encoded using all zeroes as coefficients, the first coding table or the second coding table, and the second sub-block of the two sub-blocks of the V block is encoded using all zeroes as coefficients, the first coding table or the second coding table. The plurality of sub-blocks include chroma sub-blocks, wherein when the chroma sub-blocks are partitioned by a vertical partition, a U block includes four sub-blocks, and a V block includes four sub-blocks, wherein each sub-block of the four sub-blocks of the U block is encoded using all zeroes as coefficients, a first coding table or a second coding table, and wherein each sub-block of the four sub-blocks of the V block is encoded using all zeroes as coefficients, the first coding table or the second coding table. Encoding the at least one sub-block of the plurality of sub-blocks includes a bit to signal whether chroma sub-block encoding is on or off, a second bit to signal a horizontal partitioning or vertical partitioning, and a set of bits to signal a chroma sub-block type which specifies a coding table used for encoding a chroma sub-block.

In another aspect, an apparatus comprises a non-transitory memory for storing an application, the application for: partitioning a content block into a plurality of sub-blocks, encoding at least one sub-block of the plurality of sub-blocks using a plurality of variable length coding tables to generate a plurality of encoded sub-blocks and selecting an encoded sub-block of the plurality of encoded sub-blocks based on which encoded sub-block of the plurality of encoded sub-blocks includes a fewest amount of bits and a processor coupled to the memory, the processor configured for processing the application. The plurality of sub-blocks include luma sub-blocks, wherein a first row of a luma sub-block is encoded using a first coding table, and a second row of the luma sub-block includes two sub-blocks which are each encoded using the first coding table, a second coding table or a third coding table, further wherein the two sub-blocks are encoded using a same coding table or a different coding table. Encoding the at least one sub-block of the plurality of sub-blocks includes a bit to signal whether luma sub-block encoding is on or off, and a bit to signal a luma sub-block type which specifies a coding table used for encoding a luma sub-block. The plurality of sub-blocks include chroma sub-blocks, wherein when the chroma sub-blocks are partitioned by a horizontal partition, a U block includes two sub-blocks, and a V block includes two sub-blocks, wherein a first sub-block of the two sub-blocks of the U block is encoded using a first coding table or a second coding table, and the second sub-block of the two sub-blocks of the U block is encoded using all zeroes as coefficients, the first coding table or the second coding table, and wherein a first sub-block of the two sub-blocks of the V block is encoded using the first coding table or the second coding table, and the second sub-block of the two sub-blocks of the V block is encoded using all zeroes as coefficients, the first coding table or the second coding table. The plurality of sub-blocks include chroma sub-blocks, wherein when the chroma sub-blocks are partitioned by a vertical partition, a U block includes two sub-blocks, and a V block includes two sub-blocks, wherein a first sub-block of the two sub-blocks of the U block is encoded using all zeroes as coefficients, a first coding table or a second coding table, and the second sub-block of the two sub-blocks of the U block is encoded using all zeroes as coefficients, the first coding table or the second coding table, and wherein a first sub-block of the two sub-blocks of the V block is encoded using all zeroes as coefficients, the first coding table or the second coding table, and the second sub-block of the two sub-blocks of the V block is encoded using all zeroes as coefficients, the first coding table or the second coding table. The plurality of sub-blocks include chroma sub-blocks, wherein when the chroma sub-blocks are partitioned by a vertical partition, a U block includes four sub-blocks, and a V block includes four sub-blocks, wherein each sub-block of the four sub-blocks of the U block is encoded using all zeroes as coefficients, a first coding table or a second coding table, and wherein each sub-block of the four sub-blocks of the V block is encoded using all zeroes as coefficients, the first coding table or the second coding table. Encoding the at least one sub-block of the plurality of sub-blocks includes a bit to signal whether chroma sub-block encoding is on or off, a second bit to signal a horizontal partitioning or vertical partitioning, and a set of bits to signal a chroma sub-block type which specifies a coding table used for encoding a chroma sub-block.

In another aspect, a system comprises a first computing device configured for: partitioning a content block into a plurality of sub-blocks, encoding at least one sub-block of the plurality of sub-blocks using a plurality of variable length coding tables to generate a plurality of encoded sub-blocks and selecting an encoded sub-block of the plurality of encoded sub-blocks based on which encoded sub-block of the plurality of encoded sub-blocks includes a fewest amount of bits and a second computing device configured for: decoding the encoded at least one sub-block. The plurality of sub-blocks include luma sub-blocks, wherein a first row of a luma sub-block is encoded using a first coding table, and a second row of the luma sub-block includes two sub-blocks which are each encoded using the first coding table, a second coding table or a third coding table, further wherein the two sub-blocks are encoded using a same coding table or a different coding table. Encoding the at least one sub-block of the plurality of sub-blocks includes a bit to signal whether luma sub-block encoding is on or off, and a bit to signal a luma sub-block type which specifies a coding table used for encoding a luma sub-block. The plurality of sub-blocks include chroma sub-blocks, wherein when the chroma sub-blocks are partitioned by a horizontal partition, a U block includes two sub-blocks, and a V block includes two sub-blocks, wherein a first sub-block of the two sub-blocks of the U block is encoded using a first coding table or a second coding table, and the second sub-block of the two sub-blocks of the U block is encoded using all zeroes as coefficients, the first coding table or the second coding table, and wherein a first sub-block of the two sub-blocks of the V block is encoded using the first coding table or the second coding table, and the second sub-block of the two sub-blocks of the V block is encoded using all zeroes as coefficients, the first coding table or the second coding table. The plurality of sub-blocks include chroma sub-blocks, wherein when the chroma sub-blocks are partitioned by a vertical partition, a U block includes two sub-blocks, and a V block includes two sub-blocks, wherein a first sub-block of the two sub-blocks of the U block is encoded using all zeroes as coefficients, a first coding table or a second coding table, and the second sub-block of the two sub-blocks of the U block is encoded using all zeroes as coefficients, the first coding table or the second coding table, and wherein a first sub-block of the two sub-blocks of the V block is encoded using all zeroes as coefficients, the first coding table or the second coding table, and the second sub-block of the two sub-blocks of the V block is encoded using all zeroes as coefficients, the first coding table or the second coding table. The plurality of sub-blocks include chroma sub-blocks, wherein when the chroma sub-blocks are partitioned by a vertical partition, a U block includes four sub-blocks, and a V block includes four sub-blocks, wherein each sub-block of the four sub-blocks of the U block is encoded using all zeroes as coefficients, a first coding table or a second coding table, and wherein each sub-block of the four sub-blocks of the V block is encoded using all zeroes as coefficients, the first coding table or the second coding table. Encoding the at least one sub-block of the plurality of sub-blocks includes a bit to signal whether chroma sub-block encoding is on or off, a second bit to signal a horizontal partitioning or vertical partitioning, and a set of bits to signal a chroma sub-block type which specifies a coding table used for encoding a chroma sub-block.

DETAILED DESCRIPTION OF THE PREFERRED EMBODIMENT

To improve a coder/decoder ("codec"), entropy coding is optimized. Entropy coding is binarization utilized to compress data, and the compression is able to be performed block by block. For example, a 16×2 image block is encoded such that the result includes header bits, entropy coded bits and refinement bits.

Figure 1:
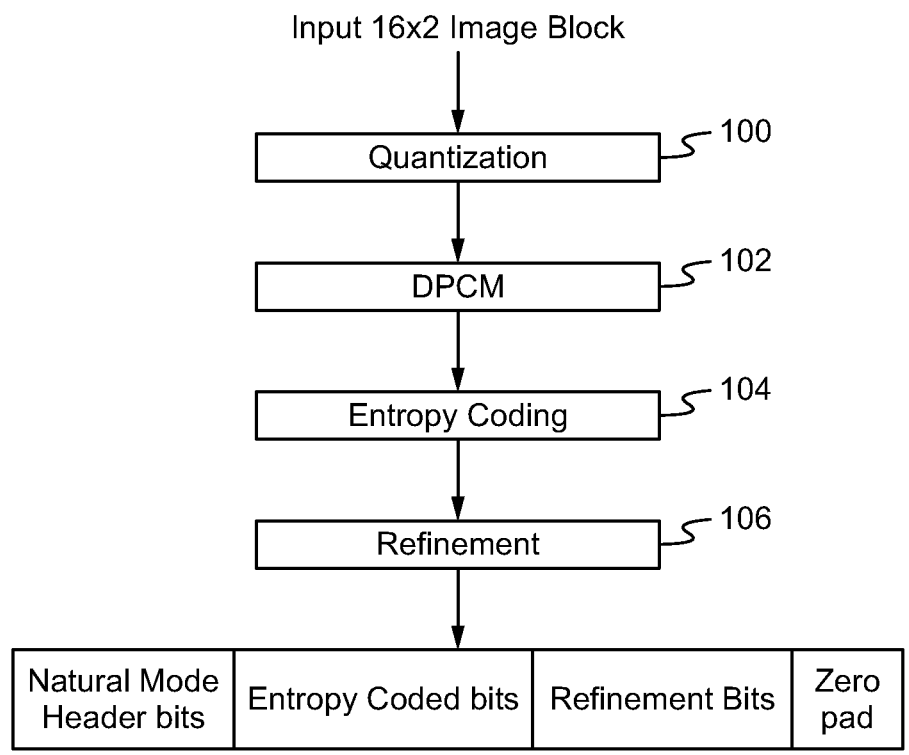
FIG. 1 illustrates a flowchart of a method of implementing a codec according to some embodiments.

FIG. 1 illustrates a flowchart of a method of implementing a codec according to some embodiments. An image block (e.g., a 16×2 input image block) is quantized in the step 100. Quantization is a lossy compression technique by compressing a range of values to a single quantum value. In the step of 102, Differential Pulse-Code Modulation (DPCM) is utilized to digitally represent sampled signals using prediction. In DPCM-based coding, a residual signal is generated by differencing the neighboring quantized pixel value. In the step 104, modified entropy coding is implemented to compress the data. The modified entropy coding is described further herein. In the step 106, the compressed data is refined. After refinement, an encoded bitstream is available, including header bits, entropy coded bits and refinement bits.

Figure 2:
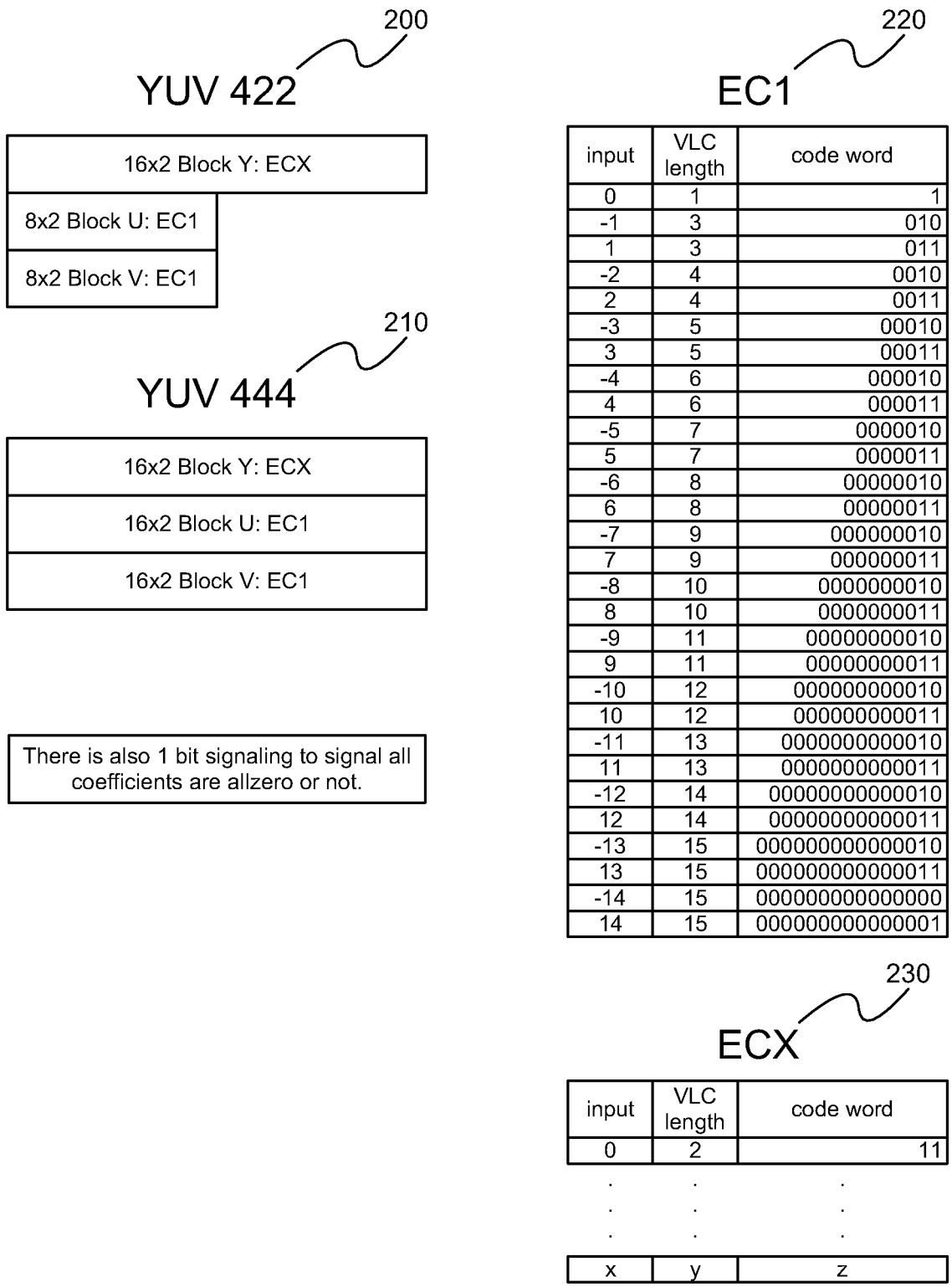
FIG. 2 illustrates a diagram of VLC tables according to some embodiments.

FIG. 2 illustrates a diagram of VLC tables according to some embodiments. There are two color encoding formats shown (YUV 422 and YUV 444), although any color encoding format is able to be utilized. As is known, YUV 444 equals 4:4:4 subsampling (e.g., Y, U and V have the same sample rate) and YUV 422 equals 4:2:2 subsampling (e.g., U and V are sampled with half the rate of Y). Y refers to luma, and U and V refer to chroma.

In the past, the same entropy coding scheme was used for an entire block (e.g., a 16×2 block). Sub-block based entropy coding, as described herein, uses two (or more) different entropy coding schemes for a block. For example, in YUV 422 (200), the 16×2 block of Y uses a first entropy coding table/scheme (e.g., ECX 230), and the 8×2 block U and the 8×2 block V use a second entropy coding table/scheme (e.g., EC1 220). In another example, in YUV 444 (210), the 16×2 block of Y uses a first entropy coding scheme (e.g., ECX), and the 16×2 block U and the 16×2 block V use a second entropy coding scheme (e.g., EC1)

Using the second entropy coding scheme (e.g., EC1), for each input, there is a unique, binary codeword. For example, input 0 results in a codeword of 1, and so on, as shown.

Therefore, blocks are divided into sub-blocks, and then the sub-blocks are entropy coded using the corresponding entropy coding scheme (e.g., ECX for Y and EC1 for U, V) as described herein. In some embodiments, each entropy coding scheme is used for each sub-block, and the best entropy coding scheme is selected for each sub-block, where best means the entropy coding scheme that results in the fewest bits. For example, a first sub-block is encoded using a first entropy coding scheme and a second entropy coding scheme, and then the number of bits for each result is compared, and the result with the fewer (or fewest if more entropy coding schemes are used) bits is used (e.g., signaled to the decoder, so that the decoder knows which entropy coding scheme to use to decode the data).

Figures 3, 4:
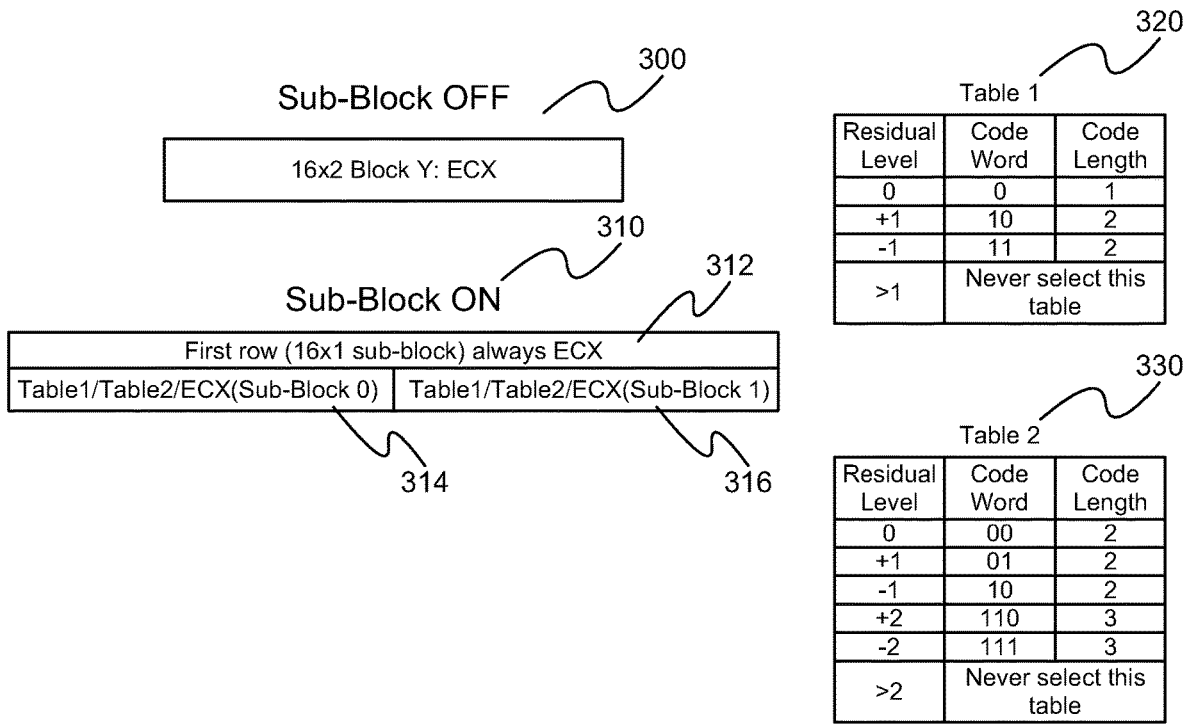
FIG. 3 illustrates a diagram regarding luma sub-block entropy coding according to some embodiments.
FIG. 4 illustrates tables for luma sub-block coding according to some embodiments.

FIG. 3 illustrates a diagram regarding luma sub-block entropy coding according to some embodiments. When sub-block is off 300, then the entire Y component of the 16×2 block is encoded using only one coding scheme (e.g., ECX). When, sub-block is on 310, then each luma sub-block is able to use a different Variable Length Coding (VLC) table or scheme. In some embodiments, a first row of luma (e.g., 16×1 sub-block 312) uses ECX entropy coding, and a second row of the luma has two sub-blocks 314, 316, left 8 samples (e.g., sub-block 0) and right 8 samples (e.g., sub-block 1), where each sub-block of the second row uses one table out of several possibilities (e.g., table 1 (320), table 2 (330) or ECX (230)). Table 1 and Table 2 are exemplary VLC tables. Table 1 also shows that if the absolute value of a residual level is greater than 1, then Table 1 is not selected, and Table 2 shows that if the absolute value of a residual level is greater than 2, then Table 2 is not selected. Although FIG. 3 shows the block divided into a first row, sub-block 0 and sub-block 1, the block is able to be divided in any manner such as sub-blocks with 4 samples each.

FIG. 4 illustrates tables for luma sub-block coding according to some embodiments. For each sub-block, the encoder signals to the decoder which entropy coding scheme is used. A bit is used to signal whether the luma sub-block is ON or OFF. If the luma sub-block is ON, additional headers are sent to signal the luma sub-block type/scheme (e.g., Table 1, Table 2 or ECX). In some embodiments, there is a special condition to signal the right sub-block type. If the sub-block type of the left sub-block is ECX, there is no chance to have the right sub-block be ECX (because if it were, then this would be the same as sub-block OFF). In this special condition, the following signaling is used: Table 1: signal 0 and Table 2: signal 1.

Table 400 shows the 1-bit to signal either luma sub-block ON or OFF. For example, when the codeword is 0, then using sub-blocks is off, and when the codeword is 1, using sub-blocks is on. Table 402 shows the header bits to signal the luma sub-block type, when the sub-block flag/bit is on. For example, codeword 10 indicates to use the Table 1 scheme/type, codeword 0 indicates to use the Table 2 scheme and codeword 11 indicates to use the ECX scheme.

Chroma is also divided into sub-blocks. Chroma horizontal sub-block size is: 8×1 for YUV422 (2 sub-blocks for U and 2 sub-blocks for V) and 16×1 for YUV444 (2 sub-blocks for U and 2 sub-blocks for V). Chroma vertical sub-block size is: 4×2 for YUV422 (2 sub-blocks for U and 2 sub-blocks for V) and 4×2 for YUV444 (4 sub-blocks for U and 4 sub-blocks for V).

Figure 5:
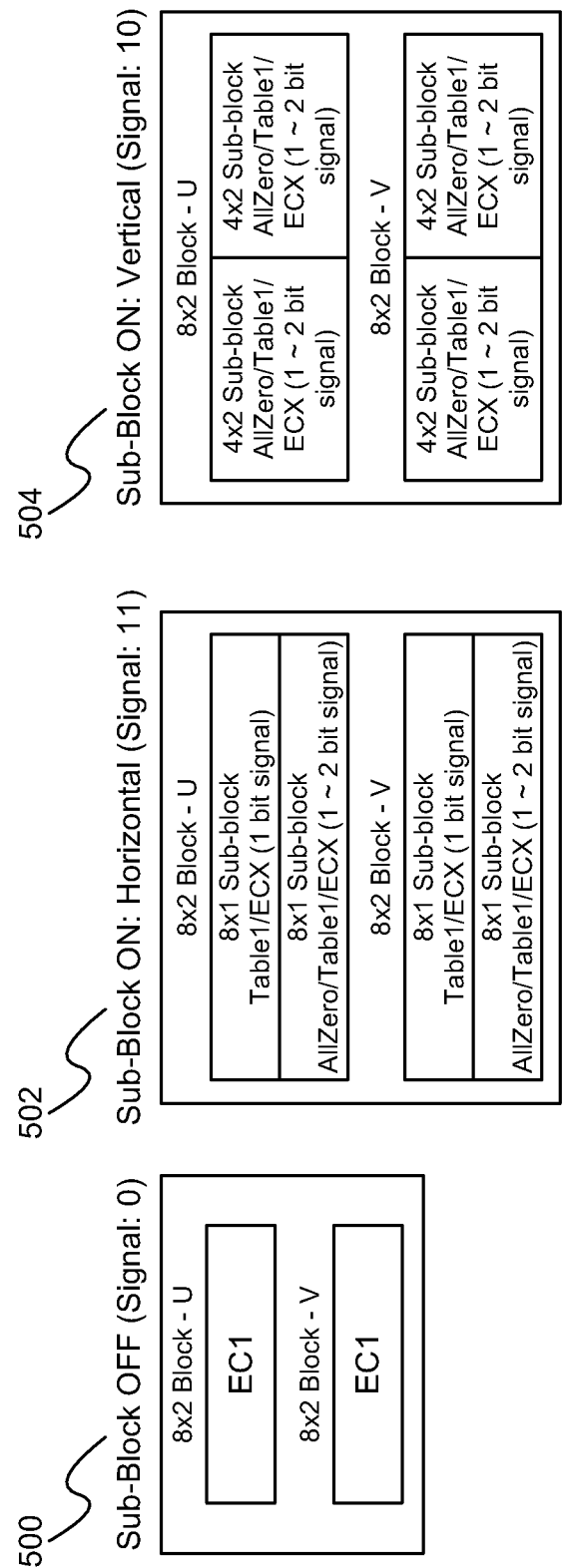
FIG. 5 illustrates diagrams for chroma sub-block coding for YUV 422 according to some embodiments.

FIG. 5 illustrates diagrams for chroma sub-block coding for YUV 422 according to some embodiments. In box 500, where the sub-block flag/signal is OFF (e.g., signal 0), then for the 8×2 blocks for U and V (chroma), the second encoding scheme/table (e.g., EC1) is used.

In box 502, where the sub-block is ON, but the partition is horizontal (e.g., signal 11) then the 8×2 block for U has an 8×1 sub-block encoded using Table 1 or ECX (1 bit signal) and another 8×1 sub-block but using AllZero, Table 1 or ECX (1 or 2 bit signal), and the 8×2 block for V has an 8×1 sub-block encoded using Table 1 or ECX (1 bit signal) and another 8×1 sub-block but using AllZero, Table 1 or ECX (1 or 2 bit signal). AllZero means all of the coefficients except the first Pulse Code Modulation (PCM) coefficient of the sub-block are zero.

In box 504, where the sub-block is ON, but the partition is vertical (e.g., signal 10) then the 8×2 block for U has a 4×2 sub-block encoded using AllZero, Table 1 or ECX (1 or 2 bit signal) and another 4×2 sub-block encoded using AllZero, Table 1 or ECX (1 or 2 bit signal), and the 8×2 block for V has a 4×2 sub-block encoded using AllZero, Table 1 or ECX (1 or 2 bit signal) and another 4×2 sub-block encoded using AllZero, Table 1 or ECX (1 or 2 bit signal).

Figure 6:
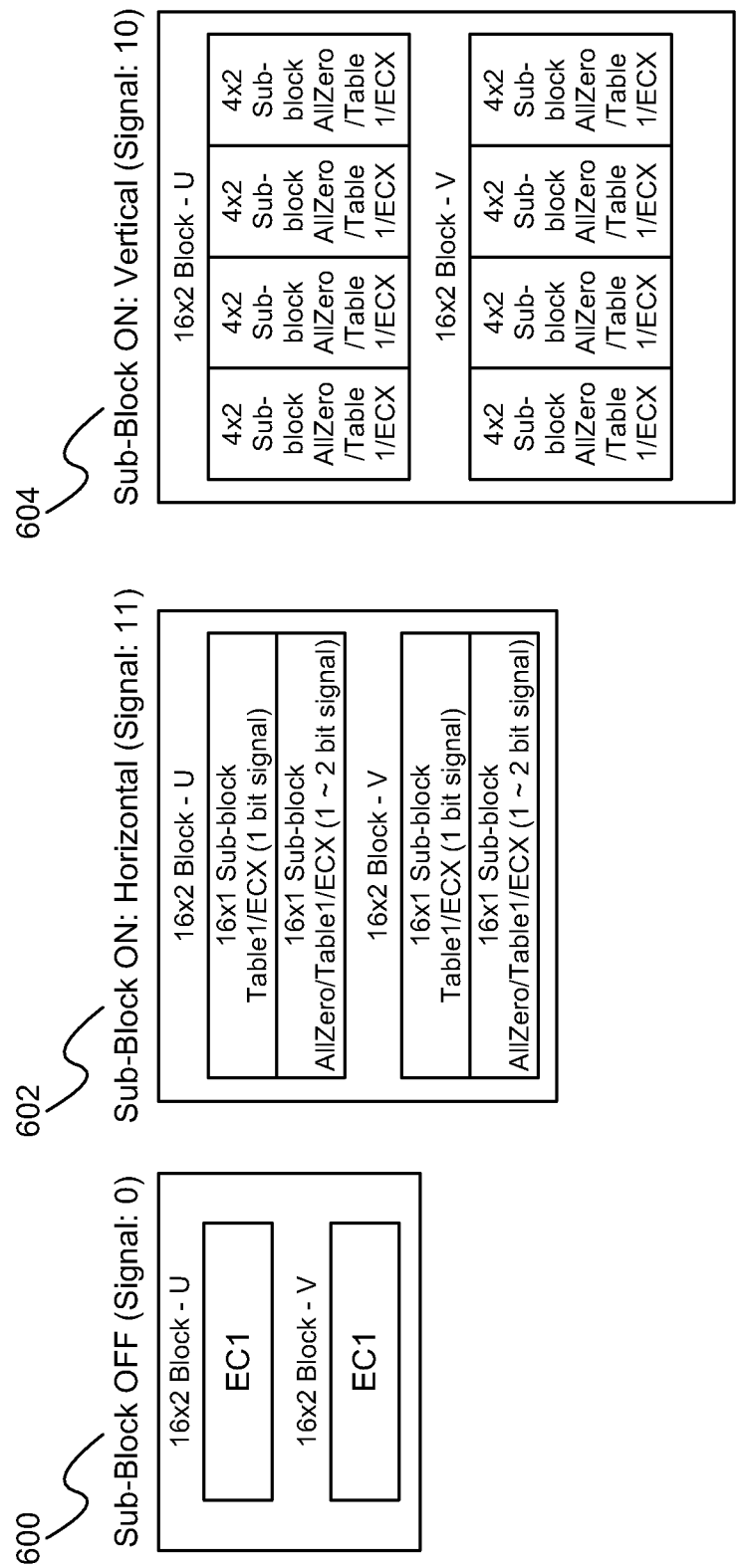
FIG. 6 illustrates diagrams for chroma sub-block coding for YUV 444 according to some embodiments.

FIG. 6 illustrates diagrams for chroma sub-block coding for YUV 444 according to some embodiments. In box 600, where the sub-block flag/signal is OFF (e.g., signal 0), then for the 16×2 blocks for U and V (chroma), the second encoding scheme/table (e.g., EC1) is used.

In box 602, where the sub-block is ON, but the partition is horizontal (e.g., signal 11) then the 16×2 block for U has a 16×1 sub-block encoded using Table 1 or ECX (1 bit signal) and another 16×1 sub-block but using AllZero, Table 1 or ECX (1 or 2 bit signal), and the 16×2 block for V has a 16×1 sub-block encoded using Table 1 or ECX (1 bit signal) and another 16×1 sub-block but using AllZero, Table 1 or ECX (1 or 2 bit signal). AllZero means all of the coefficients except the first PCM coefficient of the sub-block are zero.

In box 604, where the sub-block is ON, but the partition is vertical (e.g., signal 10) then the 16×2 block for U has four 4×2 sub-blocks encoded using AllZero, Table 1 or ECX (1 or 2 bit signal, and the 16×2 block for V has four 4×2 sub-blocks encoded using AllZero, Table 1 or ECX (1 or 2 bit signal).

For chroma sub-block coding, 1 bit signaling is used to signal whether the chroma sub-block is ON or OFF (e.g., 0 means chroma sub-block OFF, 1 means chroma sub-block ON). If chroma sub-block is ON, an additional 1 bit signaling is used to signal horizontal or vertical partitions (e.g., 0 means vertical partition, 1 means horizontal partition).

Figure 7:
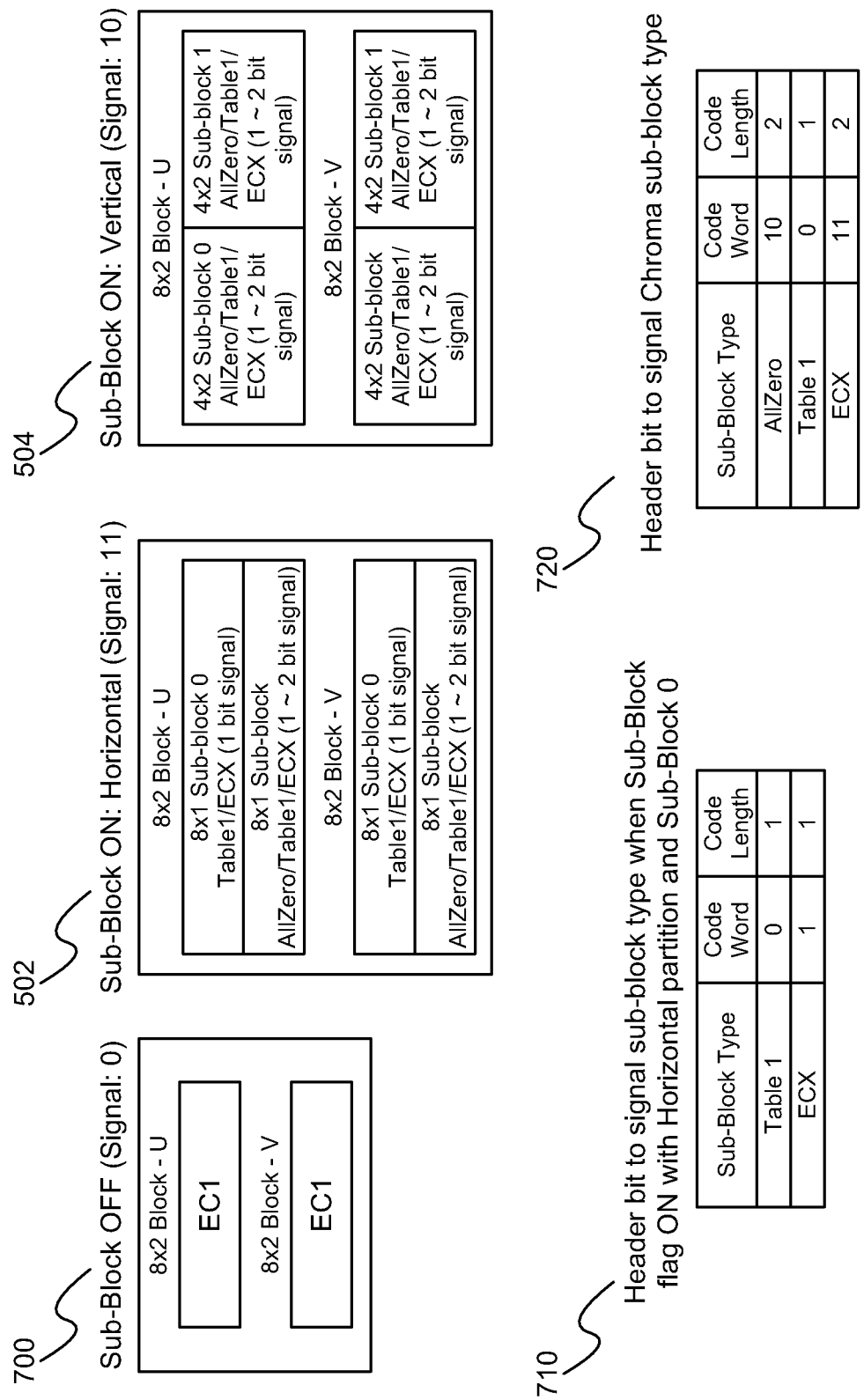
FIG. 7 illustrates a diagram of chroma sub-block coding according to some embodiments.

FIG. 7 illustrates a diagram of chroma sub-block coding according to some embodiments. In box 700, when sub-block is OFF (e.g., signal: 0), then for the 8×2 block U and the 8×2 block V, a second scheme is used (e.g., EC1).

In box 702, when sub-block is ON, but the partition is horizontal (e.g., signal 11) then the 8×2 block for U has an 8×1 sub-block 0 encoded using Table 1 or ECX (1 bit signal) and an 8×1 sub-block 1 but using AllZero, Table 1 or ECX (1 or 2 bit signal), and the 8×2 block for V has an 8×1 sub-block 0 encoded using Table 1 or ECX (1 bit signal) and an 8×1 sub-block 1 but using AllZero, Table 1 or ECX (1 or 2 bit signal).

In box 704, where the sub-block is ON, but the partition is vertical (e.g., signal 10) then the 8×2 block for U has a 4×2 sub-block 0 encoded using AllZero, Table 1 or ECX (1 or 2 bit signal) and a 4×2 sub-block 1 encoded using AllZero, Table 1 or ECX (1 or 2 bit signal), and the 8×2 block for V has a 4×2 sub-block 0 encoded using AllZero, Table 1 or ECX (1 or 2 bit signal) and a 4×2 sub-block 1 encoded using AllZero, Table 1 or ECX (1 or 2 bit signal).

To select the luma sub-block type of each luma sub-block, for each sub-block of the second row, mode selection selects the best (e.g., result with fewest bits) from the scheme options (e.g., Table 1, Table 2 or ECX).

Exemplary pseudo code to select the luma sub-block type:

```
For Each Sub-Block in 2nd Row:
    N=Total coefficients=8;
    N0=Number of zeros;
    N1=Number of +/-1;
    N2=Number of +/-2;
    if ((N0+N1)==N)
    Sub-Block-Type=Table1;
    else if ((N0+N1+N2)==N)
    Sub-Block-Type=Table2;
    else
    Sub-Block-Type=ECX;
End for
```

To select the chroma sub-block type of each chroma sub-block, for each of the sub-blocks, mode selection selects the best (e.g., result with fewest bits) from the scheme options (e.g., AllZero, Table 1, or ECX).

Exemplary pseudo code to select the chroma sub-block type:

```
For Each Sub-Block:
    N=Total coefficients;
    N0=Number of zeros;
    N1=Number of +/-1;
    if (N0==N)
    Sub-Block-Type=AllZero;
    else if ((N0+N1)==N)
    Sub-Block-Type=Table1;
    else
    Sub-Block-Type=ECX;
End for
```

Figure 8:
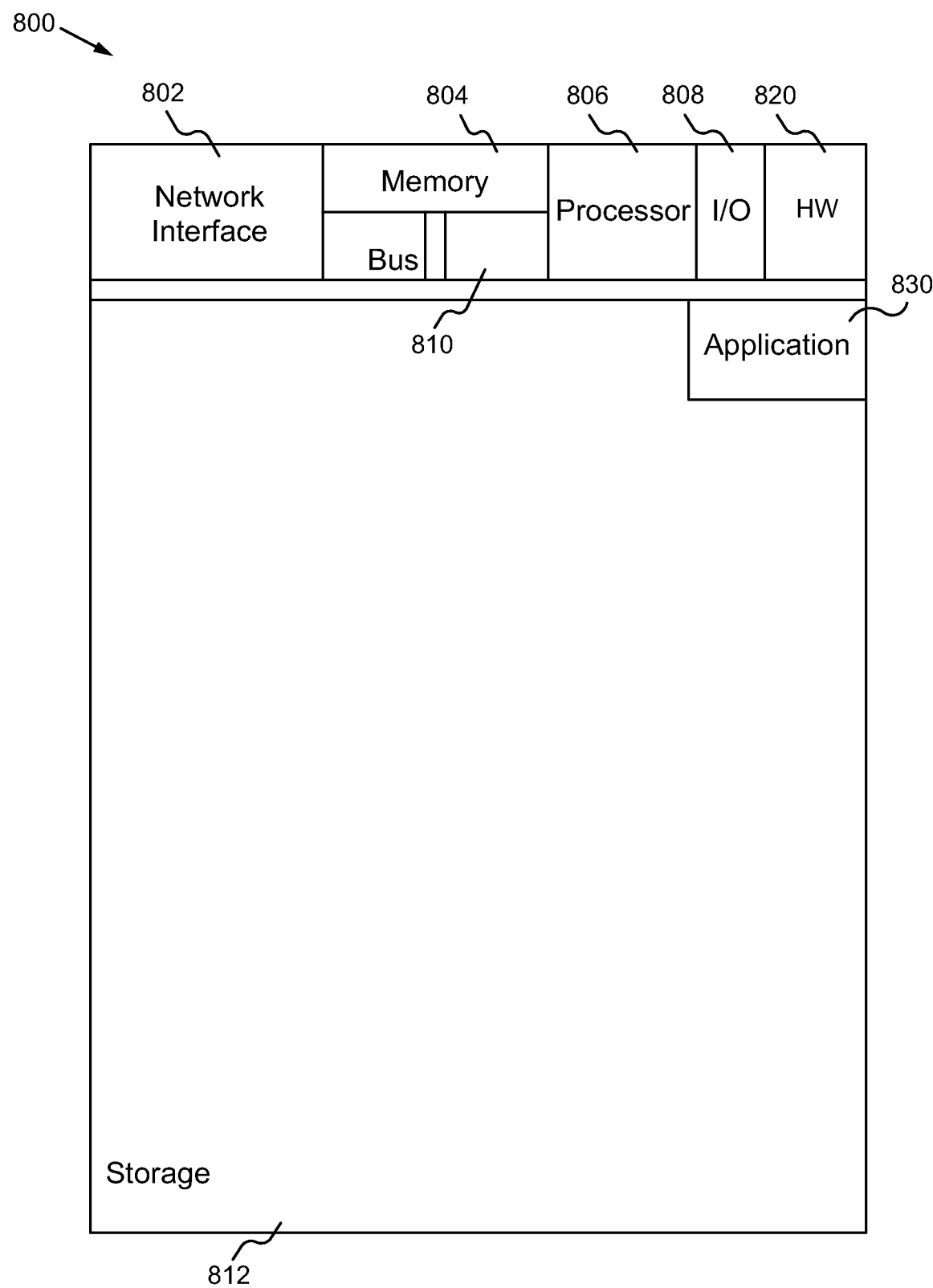
FIG. 8 illustrates a block diagram of an exemplary computing device configured to implement the sub-block based entropy coding according to some embodiments.

FIG. 8 illustrates a block diagram of an exemplary computing device configured to implement the sub-block based entropy coding according to some embodiments. The computing device 800 is able to be used to acquire, store, compute, process, communicate and/or display information such as images and videos. The computing device 800 is able to implement any of the sub-block based entropy coding aspects such as encoding and/or decoding. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, High Definition disc/drive, ultra-HD drive, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, screen, printer, modem, touchscreen, button interface and other devices. Sub-block based entropy coding application(s) 830 used to implement the sub-block based entropy coding are likely to be stored in the storage device 812 and memory 804 and processed as applications are typically processed. More or fewer components shown in FIG. 8 are able to be included in the computing device 800. In some embodiments, sub-block based entropy coding hardware 820 is included. Although the computing device 800 in FIG. 8 includes applications 830 and hardware 820 for the sub-block based entropy coding, the sub-block based entropy coding is able to be implemented on a computing device in hardware, firmware, software or any combination thereof. For example, in some embodiments, the sub-block based entropy coding applications 830 are programmed in a memory and executed using a processor. In another example, in some embodiments, the sub-block based entropy coding hardware 820 is programmed hardware logic including gates specifically designed to implement the sub-block based entropy coding.

In some embodiments, the sub-block based entropy coding application(s) 830 include several applications and/or modules. In some embodiments, modules include one or more sub-modules as well. In some embodiments, fewer or additional modules are able to be included.

In some embodiments, the sub-block based entropy coding hardware 820 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 9:
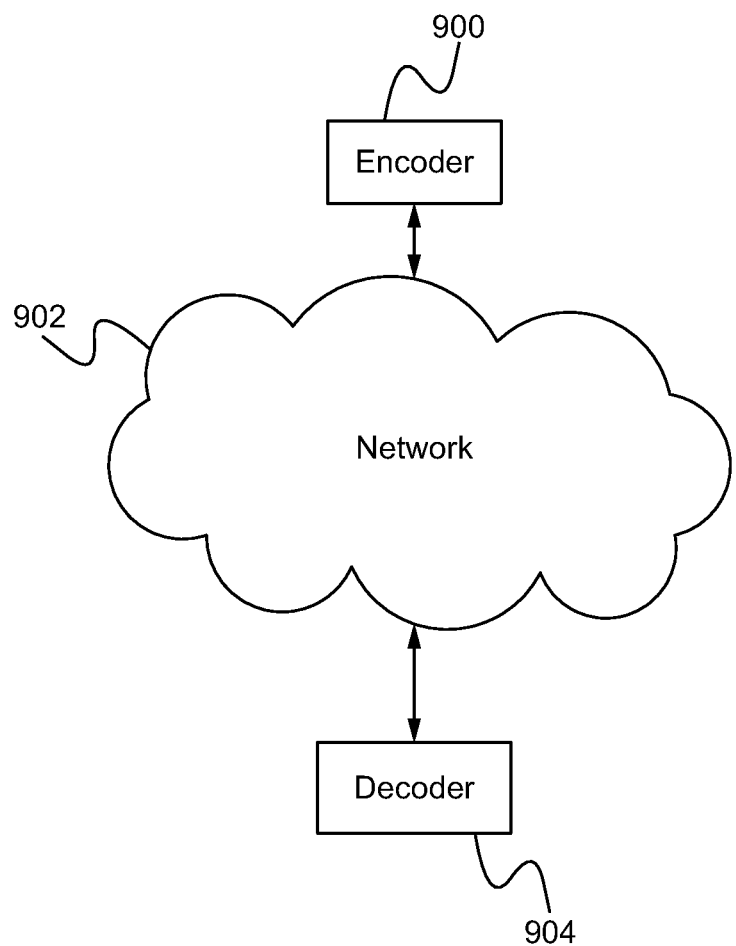
FIG. 9 illustrates a diagram of a network of devices according to some embodiments.

FIG. 9 illustrates a diagram of a network of devices according to some embodiments. Video content is encoded at one or more encoder devices 900. The encoded content is transmitted/streamed through a network 902 (e.g., the Internet, a cellular network or any other network) to one or more decoder devices 904. In some embodiments, the content is transmitted to the one or more decoder devices 904 directly without a network. The one or more devices of the network of devices (e.g., encoder device, decoder device) are configured to perform the sub-block based entropy coding implementation described herein. The one or more encoder devices 900 and the one or more decoder devices 904 are able to be any device such as servers, a personal computers, smart phones, televisions, gaming systems, vehicles or any of the devices described herein or any combination of devices described herein.

To utilize the sub-block based entropy coding described herein, devices such as digital cameras/camcorders are used to acquire content. The sub-block based entropy coding is able to be implemented with user assistance or automatically without user involvement to efficiently encode, transmit, and decode content.

In operation, the sub-block based entropy coding more efficiently encodes and decodes content by selecting the best coding scheme for sub-blocks of content.

Some Embodiments of Sub-Block Based Entropy Coding for Embedded Image Codec

1. A method programmed in a non-transitory memory of a device comprising:
   partitioning a content block into a plurality of sub-blocks;
   encoding at least one sub-block of the plurality of sub-blocks using a plurality of variable length coding tables to generate a plurality of encoded sub-blocks; and
   selecting an encoded sub-block of the plurality of encoded sub-blocks based on which encoded sub-block of the plurality of encoded sub-blocks includes a fewest amount of bits.
2. The method of clause 1 wherein the plurality of sub-blocks include luma sub-blocks, wherein a first row of a luma sub-block is encoded using a first coding table, and a second row of the luma sub-block includes two sub-blocks which are each encoded using the first coding table, a second coding table or a third coding table, further wherein the two sub-blocks are encoded using a same coding table or a different coding table.
3. The method of clause 1 wherein encoding the at least one sub-block of the plurality of sub-blocks includes a bit to signal whether luma sub-block encoding is on or off, and a bit to signal a luma sub-block type which specifies a coding table used for encoding a luma sub-block.
4. The method of clause 1 wherein the plurality of sub-blocks include chroma sub-blocks, wherein when the chroma sub-blocks are partitioned by a horizontal partition, a U block includes two sub-blocks, and a V block includes two sub-blocks,
   wherein a first sub-block of the two sub-blocks of the U block is encoded using a first coding table or a second coding table, and the second sub-block of the two sub-blocks of the U block is encoded using all zeroes as coefficients, the first coding table or the second coding table, and
   wherein a first sub-block of the two sub-blocks of the V block is encoded using the first coding table or the second coding table, and the second sub-block of the two sub-blocks of the V block is encoded using all zeroes as coefficients, the first coding table or the second coding table.
5. The method of clause 1 wherein the plurality of sub-blocks include chroma sub-blocks, wherein when the chroma sub-blocks are partitioned by a vertical partition, a U block includes two sub-blocks, and a V block includes two sub-blocks,
   wherein a first sub-block of the two sub-blocks of the U block is encoded using all zeroes as coefficients, a first coding table or a second coding table, and the second sub-block of the two sub-blocks of the U block is encoded using all zeroes as coefficients, the first coding table or the second coding table, and
   wherein a first sub-block of the two sub-blocks of the V block is encoded using all zeroes as coefficients, the first coding table or the second coding table, and the second sub-block of the two sub-blocks of the V block is encoded using all zeroes as coefficients, the first coding table or the second coding table.
6. The method of clause 1 wherein the plurality of sub-blocks include chroma sub-blocks, wherein when the chroma sub-blocks are partitioned by a vertical partition, a U block includes four sub-blocks, and a V block includes four sub-blocks,
   wherein each sub-block of the four sub-blocks of the U block is encoded using all zeroes as coefficients, a first coding table or a second coding table, and
   wherein each sub-block of the four sub-blocks of the V block is encoded using all zeroes as coefficients, the first coding table or the second coding table.
7. The method of clause 1 wherein encoding the at least one sub-block of the plurality of sub-blocks includes a bit to signal whether chroma sub-block encoding is on or off, a second bit to signal a horizontal partitioning or vertical partitioning, and a set of bits to signal a chroma sub-block type which specifies a coding table used for encoding a chroma sub-block.
8. An apparatus comprising:
   a non-transitory memory for storing an application, the application for:
     partitioning a content block into a plurality of sub-blocks;
     encoding at least one sub-block of the plurality of sub-blocks using a plurality of variable length coding tables to generate a plurality of encoded sub-blocks; and
     selecting an encoded sub-block of the plurality of encoded sub-blocks based on which encoded sub-block of the plurality of encoded sub-blocks includes a fewest amount of bits; and
   a processor coupled to the memory, the processor configured for processing the application.
9. The apparatus of clause 8 wherein the plurality of sub-blocks include luma sub-blocks, wherein a first row of a luma sub-block is encoded using a first coding table, and a second row of the luma sub-block includes two sub-blocks which are each encoded using the first coding table, a second coding table or a third coding table, further wherein the two sub-blocks are encoded using a same coding table or a different coding table.
10. The apparatus of clause 8 wherein encoding the at least one sub-block of the plurality of sub-blocks includes a bit to signal whether luma sub-block encoding is on or off, and a bit to signal a luma sub-block type which specifies a coding table used for encoding a luma sub-block.
11. The apparatus of clause 8 wherein the plurality of sub-blocks include chroma sub-blocks, wherein when the chroma sub-blocks are partitioned by a horizontal partition, a U block includes two sub-blocks, and a V block includes two sub-blocks,
    wherein a first sub-block of the two sub-blocks of the U block is encoded using a first coding table or a second coding table, and the second sub-block of the two sub-blocks of the U block is encoded using all zeroes as coefficients, the first coding table or the second coding table, and
    wherein a first sub-block of the two sub-blocks of the V block is encoded using the first coding table or the second coding table, and the second sub-block of the two sub-blocks of the V block is encoded using all zeroes as coefficients, the first coding table or the second coding table.
12. The apparatus of clause 8 wherein the plurality of sub-blocks include chroma sub-blocks, wherein when the chroma sub-blocks are partitioned by a vertical partition, a U block includes two sub-blocks, and a V block includes two sub-blocks,
    wherein a first sub-block of the two sub-blocks of the U block is encoded using all zeroes as coefficients, a first coding table or a second coding table, and the second sub-block of the two sub-blocks of the U block is encoded using all zeroes as coefficients, the first coding table or the second coding table, and
    wherein a first sub-block of the two sub-blocks of the V block is encoded using all zeroes as coefficients, the first coding table or the second coding table, and the second sub-block of the two sub-blocks of the V block is encoded using all zeroes as coefficients, the first coding table or the second coding table.

13. The apparatus of clause 8 wherein the plurality of sub-blocks include chroma sub-blocks, wherein when the chroma sub-blocks are partitioned by a vertical partition, a U block includes four sub-blocks, and a V block includes four sub-blocks, wherein each sub-block of the four sub-blocks of the U block is encoded using all zeroes as coefficients, a first coding table or a second coding table, and wherein each sub-block of the four sub-blocks of the V block is encoded using all zeroes as coefficients, the first coding table or the second coding table.

14. The apparatus of clause 8 wherein encoding the at least one sub-block of the plurality of sub-blocks includes a bit to signal whether chroma sub-block encoding is on or off, a second bit to signal a horizontal partitioning or vertical partitioning, and a set of bits to signal a chroma sub-block type which specifies a coding table used for encoding a chroma sub-block.

15. A system comprising:
   a first computing device configured for:
   partitioning a content block into a plurality of sub-blocks;
   encoding at least one sub-block of the plurality of sub-blocks using a plurality of variable length coding tables to generate a plurality of encoded sub-blocks; and
   selecting an encoded sub-block of the plurality of encoded sub-blocks based on which encoded sub-block of the plurality of encoded sub-blocks includes a fewest amount of bits; and
   a second computing device configured for:
   decoding the encoded at least one sub-block.

16. The system of clause 15 wherein the plurality of sub-blocks include luma sub-blocks, wherein a first row of a luma sub-block is encoded using a first coding table, and a second row of the luma sub-block includes two sub-blocks which are each encoded using the first coding table, a second coding table or a third coding table, further wherein the two sub-blocks are encoded using a same coding table or a different coding table.

17. The system of clause 15 wherein encoding the at least one sub-block of the plurality of sub-blocks includes a bit to signal whether luma sub-block encoding is on or off, and a bit to signal a luma sub-block type which specifies a coding table used for encoding a luma sub-block.

18. The system of clause 15 wherein the plurality of sub-blocks include chroma sub-blocks, wherein when the chroma sub-blocks are partitioned by a horizontal partition, a U block includes two sub-blocks, and a V block includes two sub-blocks, wherein a first sub-block of the two sub-blocks of the U block is encoded using a first coding table or a second coding table, and the second sub-block of the two sub-blocks of the U block is encoded using all zeroes as coefficients, the first coding table or the second coding table, and wherein a first sub-block of the two sub-blocks of the V block is encoded using the first coding table or the second coding table, and the second sub-block of the two sub-blocks of the V block is encoded using all zeroes as coefficients, the first coding table or the second coding table.

19. The system of clause 15 wherein the plurality of sub-blocks include chroma sub-blocks, wherein when the chroma sub-blocks are partitioned by a vertical partition, a U block includes two sub-blocks, and a V block includes two sub-blocks, wherein a first sub-block of the two sub-blocks of the U block is encoded using all zeroes as coefficients, a first coding table or a second coding table, and the second sub-block of the two sub-blocks of the U block is encoded using all zeroes as coefficients, the first coding table or the second coding table, and wherein a first sub-block of the two sub-blocks of the V block is encoded using all zeroes as coefficients, the first coding table or the second coding table, and the second sub-block of the two sub-blocks of the V block is encoded using all zeroes as coefficients, the first coding table or the second coding table.

20. The system of clause 15 wherein the plurality of sub-blocks include chroma sub-blocks, wherein when the chroma sub-blocks are partitioned by a vertical partition, a U block includes four sub-blocks, and a V block includes four sub-blocks, wherein each sub-block of the four sub-blocks of the U block is encoded using all zeroes as coefficients, a first coding table or a second coding table, and wherein each sub-block of the four sub-blocks of the V block is encoded using all zeroes as coefficients, the first coding table or the second coding table.

21. The system of clause 15 wherein encoding the at least one sub-block of the plurality of sub-blocks includes a bit to signal whether chroma sub-block encoding is on or off, a second bit to signal a horizontal partitioning or vertical partitioning, and a set of bits to signal a chroma sub-block type which specifies a coding table used for encoding a chroma sub-block.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   partitioning a content block into a plurality of sub-blocks;
   encoding at least one sub-block of the plurality of sub-blocks using a plurality of variable length coding tables to generate a plurality of encoded sub-blocks; and
   selecting an encoded sub-block of the plurality of encoded sub-blocks based on which encoded sub-block of the plurality of encoded sub-blocks includes a fewest amount of bits, wherein the plurality of sub-blocks include luma sub-blocks, wherein a first row of a luma sub-block is encoded using a first coding table, and a second row of the luma sub-block includes two sub-blocks which are each encoded using the first coding table, a second coding table or a third coding table, further wherein the two sub-blocks are encoded using a same coding table or a different coding table.

2. The method of claim 1 wherein encoding the at least one sub-block of the plurality of sub-blocks includes a bit to signal whether luma sub-block encoding is on or off, and a bit to signal a luma sub-block type which specifies a coding table used for encoding a luma sub-block.

3. The method of claim 1 wherein the plurality of sub-blocks include chroma sub-blocks, wherein when the chroma sub-blocks are partitioned by a horizontal partition, a U block includes two sub-blocks, and a V block includes two sub-blocks, wherein a first sub-block of the two sub-blocks of the U block is encoded using a first coding table or a second coding table, and the second sub-block of the two sub-blocks of the U block is encoded using all zeroes as coefficients, the first coding table or the second coding table, and wherein a first sub-block of the two sub-blocks of the V block is encoded using the first coding table or the second coding table, and the second sub-block of the two sub-blocks of the V block is encoded using all zeroes as coefficients, the first coding table or the second coding table.

4. The method of claim 1 wherein the plurality of sub-blocks include chroma sub-blocks, wherein when the chroma sub-blocks are partitioned by a vertical partition, a U block includes two sub-blocks, and a V block includes two sub-blocks, wherein a first sub-block of the two sub-blocks of the U block is encoded using all zeroes as coefficients, a first coding table or a second coding table, and the second sub-block of the two sub-blocks of the U block is encoded using all zeroes as coefficients, the first coding table or the second coding table, and wherein a first sub-block of the two sub-blocks of the V block is encoded using all zeroes as coefficients, the first coding table or the second coding table, and the second sub-block of the two sub-blocks of the V block is encoded using all zeroes as coefficients, the first coding table or the second coding table.

5. The method of claim 1 wherein the plurality of sub-blocks include chroma sub-blocks, wherein when the chroma sub-blocks are partitioned by a vertical partition, a U block includes four sub-blocks, and a V block includes four sub-blocks, wherein each sub-block of the four sub-blocks of the U block is encoded using all zeroes as coefficients, a first coding table or a second coding table, and wherein each sub-block of the four sub-blocks of the V block is encoded using all zeroes as coefficients, the first coding table or the second coding table.

6. The method of claim 1 wherein encoding the at least one sub-block of the plurality of sub-blocks includes a bit to signal whether chroma sub-block encoding is on or off, a second bit to signal a horizontal partitioning or vertical partitioning, and a set of bits to signal a chroma sub-block type which specifies a coding table used for encoding a chroma sub-block.

7. An apparatus comprising:

a non-transitory memory for storing an application, the application for:

partitioning a content block into a plurality of sub-blocks;

encoding at least one sub-block of the plurality of sub-blocks using a plurality of variable length coding tables to generate a plurality of encoded sub-blocks; and selecting an encoded sub-block of the plurality of encoded sub-blocks based on which encoded sub-block of the plurality of encoded sub-blocks includes a fewest amount of bits, wherein the plurality of sub-blocks include luma sub-blocks, wherein a first row of a luma sub-block is encoded using a first coding table, and a second row of the luma sub-block includes two sub-blocks which are each encoded using the first coding table, a second coding table or a third coding table, further wherein the two sub-blocks are encoded using a same coding table or a different coding table; and a processor coupled to the memory, the processor configured for processing the application.

8. The apparatus of claim 7 wherein encoding the at least one sub-block of the plurality of sub-blocks includes a bit to signal whether luma sub-block encoding is on or off, and a bit to signal a luma sub-block type which specifies a coding table used for encoding a luma sub-block.

9. The apparatus of claim 7 wherein the plurality of sub-blocks include chroma sub-blocks, wherein when the chroma sub-blocks are partitioned by a horizontal partition, a U block includes two sub-blocks, and a V block includes two sub-blocks, wherein a first sub-block of the two sub-blocks of the U block is encoded using a first coding table or a second coding table, and the second sub-block of the two sub-blocks of the U block is encoded using all zeroes as coefficients, the first coding table or the second coding table, and wherein a first sub-block of the two sub-blocks of the V block is encoded using the first coding table or the second coding table, and the second sub-block of the two sub-blocks of the V block is encoded using all zeroes as coefficients, the first coding table or the second coding table.

10. The apparatus of claim 7 wherein the plurality of sub-blocks include chroma sub-blocks, wherein when the chroma sub-blocks are partitioned by a vertical partition, a U block includes two sub-blocks, and a V block includes two sub-blocks, wherein a first sub-block of the two sub-blocks of the U block is encoded using all zeroes as coefficients, a first coding table or a second coding table, and the second sub-block of the two sub-blocks of the U block is encoded using all zeroes as coefficients, the first coding table or the second coding table, and wherein a first sub-block of the two sub-blocks of the V block is encoded using all zeroes as coefficients, the first coding table or the second coding table, and the second sub-block of the two sub-blocks of the V block is encoded using all zeroes as coefficients, the first coding table or the second coding table.

11. The apparatus of claim 7 wherein the plurality of sub-blocks include chroma sub-blocks, wherein when the chroma sub-blocks are partitioned by a vertical partition, a U block includes four sub-blocks, and a V block includes four sub-blocks, wherein each sub-block of the four sub-blocks of the U block is encoded using all zeroes as coefficients, a first coding table or a second coding table, and wherein each sub-block of the four sub-blocks of the V block is encoded using all zeroes as coefficients, the first coding table or the second coding table.

12. The apparatus of claim 7 wherein encoding the at least one sub-block of the plurality of sub-blocks includes a bit to signal whether chroma sub-block encoding is on or off, a second bit to signal a horizontal partitioning or vertical partitioning, and a set of bits to signal a chroma sub-block type which specifies a coding table used for encoding a chroma sub-block.

13. A system comprising:

a first computing device configured for:

partitioning a content block into a plurality of sub-blocks;

encoding at least one sub-block of the plurality of sub-blocks using a plurality of variable length coding tables to generate a plurality of encoded sub-blocks; and selecting an encoded sub-block of the plurality of encoded sub-blocks based on which encoded sub-block of the plurality of encoded sub-blocks includes a fewest amount of bits, wherein the plurality of sub-blocks include luma sub-blocks, wherein a first row of a luma sub-block is encoded using a first coding table, and a second row of the luma sub-block includes two sub-blocks which are each encoded using the first coding table, a second coding table or a third coding table, further wherein the two sub-blocks are encoded using a same coding table or a different coding table; and a second computing device configured for:

decoding the encoded at least one sub-block.

14. The system of claim 13 wherein encoding the at least one sub-block of the plurality of sub-blocks includes a bit to signal whether luma sub-block encoding is on or off, and a bit to signal a luma sub-block type which specifies a coding table used for encoding a luma sub-block.

15. The system of claim 13 wherein the plurality of sub-blocks include chroma sub-blocks, wherein when the chroma sub-blocks are partitioned by a horizontal partition, a U block includes two sub-blocks, and a V block includes two sub-blocks, wherein a first sub-block of the two sub-blocks of the U block is encoded using a first coding table or a second coding table, and the second sub-block of the two sub-blocks of the U block is encoded using all zeroes as coefficients, the first coding table or the second coding table, and wherein a first sub-block of the two sub-blocks of the V block is encoded using the first coding table or the second coding table, and the second sub-block of the two sub-blocks of the V block is encoded using all zeroes as coefficients, the first coding table or the second coding table.

16. The system of claim 13 wherein the plurality of sub-blocks include chroma sub-blocks, wherein when the chroma sub-blocks are partitioned by a vertical partition, a U block includes two sub-blocks, and a V block includes two sub-blocks, wherein a first sub-block of the two sub-blocks of the U block is encoded using all zeroes as coefficients, a first coding table or a second coding table, and the second sub-block of the two sub-blocks of the U block is encoded using all zeroes as coefficients, the first coding table or the second coding table, and wherein a first sub-block of the two sub-blocks of the V block is encoded using all zeroes as coefficients, the first coding table or the second coding table, and the second sub-block of the two sub-blocks of the V block is encoded using all zeroes as coefficients, the first coding table or the second coding table.

17. The system of claim 13 wherein the plurality of sub-blocks include chroma sub-blocks, wherein when the chroma sub-blocks are partitioned by a vertical partition, a U block includes four sub-blocks, and a V block includes four sub-blocks, wherein each sub-block of the four sub-blocks of the U block is encoded using all zeroes as coefficients, a first coding table or a second coding table, and wherein each sub-block of the four sub-blocks of the V block is encoded using all zeroes as coefficients, the first coding table or the second coding table.

18. The system of claim 13 wherein encoding the at least one sub-block of the plurality of sub-blocks includes a bit to signal whether chroma sub-block encoding is on or off, a second bit to signal a horizontal partitioning or vertical partitioning, and a set of bits to signal a chroma sub-block type which specifies a coding table used for encoding a chroma sub-block.

* * * * *